3,275,576
CATION-EXCHANGERS FROM CROSS-LINKED POLYHYDROXY MATERIALS
Per G. M. Flodin, Perstorp, Johan A. O. Johansson, Uppsala, and Stig Å. I. Carlsson, Molnlycke, Sweden, assignors to Aktiebolaget Pharmacia, Uppsala, Sweden, a Swedish company
No Drawing. Filed Nov. 23, 1965, Ser. No. 509,415
Claims priority, application Sweden, June 12, 1959, 5,620/59
2 Claims. (Cl. 260—2.2)

This is a continuation-in-part of our application Serial No. 34,374, filed June 7, 1960, and now abandoned.

The invention generally pertains to substitution products of hydrophilic high molecular weight copolymerizates of aliphatic hydroxyl group-containing substances with bifunctional organic substances. More particularly, this invention relates to substitution products of hydrophilic high molecular weight copolymerizates of aliphatic hydroxyl group-containing substances with bifunctional organic substances, obtained by reacting the hydroxyl groups of the copolymerizates with a monofunctional substance to form novel products possessing valuable properties for different uses and especially useful as cation-exchangers for separating purposes.

In the specification and the claims the term "copolymerizate" is used to define a product obtained by the chemical combination of a number of similar units to form a single molecule, wherein polymerization phenomena as well as condensation reactions have been involved.

THE INVENTION BROADLY

The novel products according to the present invention are copolymerizates of:

(a) A member selected from the group consisting of dextran, sucrose, starch, sorbitol, dextrin, polyvinyl alcohol, and hydroxyethyl cellulose;

(b) A bifunctional organic substance selected from the group consisting of epichlorohydrin, bis-epoxypropylether and ethylene glycol-bis-epoxy propyl ether which is capable of linking together the aforesaid members by the formation of ether linkages;

(c) Said copolymerizate orginally containing from 10 to 35 percent of hydroxyl groups, based on the weight of the dry substance, and having from 6 to 50 percent of their hydroxyl groups originally present in the formation substituted by a member selected from the group consisting of radicals of the type $R_1Y$, wherein (d) $R_1$ is an alkylene containing from one to two, inclusive, carbon atoms, and (e) Y is selected from the group consisting of carboxyl and sulfo; and said novel compound, (f) Being insoluble in water but capable of swelling therein;

(g) Having a waterregain within the range of 1–50 grams per gram of the dry compound, and (h) Having an ion-exchange capacity within the range of from 2 to 6 milliequivalents per gram of the dry compound.

From physical viewpoint, the novel substituted copolymerizates consist of a three-dimensional macroscopic network of residues of the aliphatic hydroxyl group-containing substances, bonded together by ether bridges of the formula —R—O—X—O—R—, wherein R represents the residue of the aliphatic hydroxyl group-containing substance and X is a residue of the bifunctional substance, the said copolymerizates having connected thereto by oxygen bridges groups of the general formula —$R_1Y$, wherein $R_1$ and Y each have the above significance. In addition to the substituted copolymerizates as substances, the invention also includes cation-exchangers consisting of these substances.

The novel substituted copolymerizates according to the invention are obtained by reacting the unsubstituted copolymerizate of the type referred to with a monofunctional substance of the formula $X_1$—$R_1$—Y, wherein $X_1$ is selected from the group consisting of chloro and bromo and $R_1$ and Y have the significances set forth above. However, it is also possible to prepare the novel compounds by first reacting one of the members listed under (a) above with the monofunctional substance of the formula $X_1$—$R_1$—Y to introduce the ion-exchanging groups and then carrying out the copolymerization process.

THE HYDROPHILIC HIGH MOLECULAR WEIGHT COPOLYMERIZATE

The hydrophilic high molecular weight copolymerizate used as a starting material for the preparation of the substituted product according to the invention should have a high content of hydroxyl groups. Preferably this content should be in the range of about 10 to 35 percent.

The particle size of the starting material should preferably be in the range of 0.01 to 2 mm.

The water regain of the starting material should be in the range of from 1 to 50 g./g. of the dry copolymerizate. The term "water regain" is intended to mean the amount of water in grams which can be absorbed by 1 g. of the dry condensation product with swelling. The starting material should not contain any charge-producing groups.

The copolymerizates to be used as a starting material for the production of the novel products are obtained by reacting the polyhydroxyl compounds set forth above with the bifunctional organic compounds.

The copolymerization of these organic hydroxyl group-containing substances with the bifunctional substances readily takes place by reacting the components in aqueous solution in the presence of an alkaline reacting substance as a catalyst.

For example, a gel product excellently suitable as a starting material to produce the novel ion-exchangers according to the invention may be obtained by reacting dextram having an average molecular weight within the range of from 20,000 to 100,000 with epichlorohydrin which results in a copolymerization consisting of a three-dimensional macroscopic network, built up of chains of mainly alpha-1,6-glycosidically bonded glucose residues bound together by ether bridges of the type

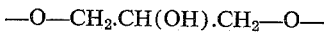
—O—$CH_2$.CH(OH).$CH_2$—O— said gel having a content of hydroxyl groups of at least 15% of the weight of the dry gel and a water regain within the range of from about 1 to 50 g./g. of the dry gel product.

Another example is a gel produced by reacting white commercial dextrin having an average molecular weight in the range of about 20,000 to 50,000 with epichlorohydrin which results in a copolymerizate consisting of a three dimensional macroscopic network, built up of chains of mainly alpha-1,4-glycosidically bonded glucose residues bound together by ether bridges of the type

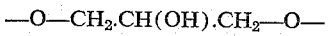
—O—$CH_2$.CH(OH).$CH_2$—O—

This gel has a hydroxyl group content of at least 15% of the weight of the dry gel and a comparatively low water regain substantially within the range 1–20 g./g. of the dry gel product.

Similarly, a gel product of the same fundamental structure may be obtained from potato starch and epichlorohydrin, but this gel has a higher water regain within the range of 10–50 g./g. of the dry gel product.

Further, a suitable gel product may be obtained by reacting sorbitol with epichlorohydrin. Hereby a copolymerizate is obtained having a content of hydroxy groups of about 15% of the weight of the dry gel and a water regain within the range of from about 1 to 10 and which is especially suitable for use in cases where the gel may come into contact with a liquid of a comparatively high acidity, for example hydrochloric acid.

THE MONOFUNCTIONAL COMPOUND

Suitable monofunctional substances for carrying out the substitution to form the novel products according to the invention may be selected from chloro or bromo substituted carboxylic and sulfo acids and salts thereof, for example chloroacetic acid, bromoacetic acid, chloropropionic acid, chloromethanesulfonic acid, bromoethanesulfonic acid, chloroethanesulfonic acid and salts, preferably alkali metal and alkaline earth metal salts thereof.

REACTION MEDIUM AND CATALYST

The reaction takes place in the presence of water and is catalyzed by alkaline substances. It can be illustrated by the following scheme:

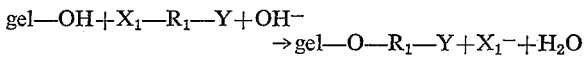

$$\text{gel—OH} + X_1\text{—}R_1\text{—}Y + OH^- \rightarrow \text{gel—O—}R_1\text{—}Y + X_1^- + H_2O$$

wherein $X_1$, $R_1$ and Y have the meanings as set forth above and "gel" means the copolymerizate referred to above in gel form.

The reaction scheme discloses that the reaction proceeds with the consumption of the alkaline substance.

As examples of alkaline substances catalyzing the reaction mentioned should be made of the alkali metal hydroxides and the alkaline earth metal hydroxides.

The hydrophilic higher molecular weight copolymerizate is gel-forming and should be in the form of gel grains when subjected to the substitution reaction. Preferably the product should be in the swollen form to allow the bifunctional substance to diffuse into the spaces of the substance to result in a substitution product as uniformly substituted as possible.

It is necessary that the substitution reaction should take place at a lower speed than the diffusion rate, from which follows that the conditions will be more unfavourable, the larger are the grains employed. However, it has been found that, under all circumstances, it is possible to achieve a reaction product of a substitution sufficiently uniform for practical purposes if the size of the gel grains employed for the substitution reaction does not exceed the limit value of about 2 mm.

The best manner of carrying out the substitution reaction consists in first causing the hydroxyl group-containing starting material to swell in water in the presence of either the alkaline substance or the monofunctional compound of the formula $X_1\text{—}R_1\text{—}Y$ and adding the failing component, if desired in portions to initiate the reaction. Alternatively the copolymerizate may first be swollen in pure water and after swelling has taken place the two failing reaction components can be added either simultaneously or separately.

However, the amount of water present in the reaction for introducing the acid groups should not be so high as to cause any substantial reaction between the water and the monofunctional compound to take place, as such a non-desired reaction would tend to increase the costs for the production of the substitution products. The water regain of the copolymerizate indicates the maximum amount of water which can be present during the substitution reaction.

REACTION TEMPERATURES AND TIMES

Suitable reaction temperatures are in the range of about 15 to 120° C. Although the substitution reaction proceeds more rapidly with increasing temperatures, it has been found that side-reactions, particularly the reaction between the water and the monofunctional compound will tend to increase at higher temperatures such as exceeding about 100° C. Reaction temperatures exceeding 100° C. are ordinarily avoided because they require the reactions to be carried out in a pressure vessel. Satisfactory reaction speeds are ordinarily obtained in the range of about 50 to 90° C.

The period of time necessary for completing the reaction depends, of course, on the temperature chosen for the reaction. For reaction temperatures in the range of 15 to 120° C. it can be said that the reaction can be completed within about 2 to 48 hours.

THE AMOUNTS OF THE REACTANTS AND THE MIXING THEREOF

The proportion of the monofunctional compound to the hyrdophilic high molecular weight copolymerizate should be such that the reaction results in a substitution product, wherein at least about 6 percent of the hydroxyl groups originally present are substituted (on average about every fifteenth hydroxyl-group). For practical purposes, especially if the substitution products are to be used as ion-exchangers, the proportion should be such that the reaction results in a product wherein at least 10 percent of the hydroxyl groups of the product are substituted.

As a rule it can be said that degrees of substitution exceeding about 50 percent (on average about every second hydroxyl group of the copolymerizate) do not fulfill any practical purpose. If the substitution are to be used for ion-exchange purpose, the degree of substitution should not exceed 30 percent (on average about every third hydroxyl group of the copolymerizate).

The ratio by weight of the monofunctional compound to the copolymerizate should preferably be in the range of about 1:10 to 5:1.

The alkaline catalyst should be added to the mixture of reactants in an amount exceeding that necessary for producing the reaction of the copolymerizate. This excess may preferably be about 10 percent.

It is of importance that the water, which may contain the alkali or the substance X—$R_1$—Z dissolved therein, should be as uniformly distributed throughout the mass of swollen copolymerizate as possible, as the grains are separated from each other and the contact surface between them is not very large.

Independently of the order and the manner by which the reaction components are brought together to effect the substitution it is preferably to provide an effective agitation of the reacting mixture.

For this purpose it may be suitable to carry out the substitution reaction in the presence of a solvent immiscible with the water, for example aliphatic or aromatic hydrocarbons such as toluene. Hereby the solvent fulfills the double purpose of serving on one hand as a suspending agent for the reacting mixture and on the other hand as an aid for removing the heat liberated in the substitution reaction and/or maintaining the reaction temperature at a constant value. Such a solvent may also serve as a solvent for the acid group-containing reaction component.

SPECIAL PRECAUTION STEPS IN THE REACTION

It has been found that even at relatively low reaction temperatures the oxygen of the atmosphere tends to oxidize the copolymerizates in gel form, what may result in a miscolourization of the reaction formed. When it is desired to obtain a substitution product as little coloured as possible, the reaction should be carried out in an inert atmosphere. Such an atmosphere may be provided by nitrogen which is substantially inert to the reaction components involved.

In order to avoid a miscolourization of the substitution product it may be suitable to add certain additives to the mixure of reactants. Such an additive is preferably a reduction agent the purpose of which is to reduce oxygen possibly present. As an example of a suitable reduction agent mention should be made of sodium-borohydride.

CHEMICAL AND PHYSICAL PROPERTIES OF THE REACTION PRODUCT

As a general rule it may be said that the substitution product according to the invention is characterized by a higher water regain than the starting material. This increase obviously depends on the introduction of the ion-exchange groups into the copolymerizate.

The factors determining whether, or not, a substituted copolymerizate according to the invention is suitable for ion-exchange purposes are the water regain and the ion exchange capacity.

The factors determining the water regain of the substituted product are the water regain of the starting material, the type of substituent and the substitution degree.

The water regain of the starting material depends largely on the degree of cross-linking of the copolymerizate. This degree may be varied by varying the ratio of the bifunctional substance to the hydrophilic hydroxyl group-containing substance in the copolymerizate.

The swelling capacity, expressed as the "water regain," of the substitution product should be determined in distilled water as salts possibly present in the water tend to dislocate the results. The swelling tends to increase in the presence of great amounts of salts. This phenomenon corresponds to the "breathing" of ion-exchangers which will be more marked the higher is the water regain of the substitution product.

The ion-exchange capacity of the substitution product can be determined according to any one of the standard methods described in Kunin, "Ion Exchange Resins," New York, 1958 (see: page 341–342). The ion-exchange capacity is expressed in milliequivalents exchangeable ions per gram of the dry substituted copolymerizate.

TECHNICAL USE AND ADVANTAGES OF THE SUBSTITUTED COPOLYMERIZATE

The novel products according to the invention should preferably be used as cation-exchangers.

The cation-exchangers are of the same type as those described in the Journal of the American Chemical Society, vol. 78, Feb. 20, 1956, pages 751–753. These exchangers are characterized by showing a very little so-called background adsorption, which render them particularly useful for the chromatography of mixtures of large molecules.

The exchangers referred to are produced from hydroxyl group-containing substances by reacting them with compounds to introduce acid groups therein. Adsorbents obtained by introducing groups consisting of carboxymethyl or phosphate into cellulose through oxygen bridges have been found to possess exceptional merit in the chromatography of proteins and nucleic acids.

The preparation of ion exchangers of this type is, however, subject to a limitation arising from the nature of the cross-linking bonds in cellulose. Hydrogen bonding between the hydroxyl groups is responsible for the insolublity of that material, and the attachment of small amounts of any substituent to the chain tends to increase swelling in water by interfering with hydrogen bonding. A large number of groups will cause the cellulose derivative to become water-soluble. Although ion-exchanging adsorbents of the type referred to having cation-exchange capacity of 2 milliequivalents per gram have been achieved by introducing acid groups in the cellulose, it has been found that products having cation-exchange capacity of more than 1 milliequivalent per gram have a tendency to be gelatinous due to the influence of water.

The novel products according to the invention may be rendered ion-exchange capacities of as high as 5 milliequivalents per gram or more by introducing the special acid groups described above in the copolymerizates of hydroxyl group-containing substances. When using the novel products as ion-exchangers, no tendency towards being gelatinous or dissolving in contact with water has been observed.

As different from the known ion-exchangers obtained by sulfonating carbon or introducing acid groups in synthetic and natural resins, the present products do not show any essential so-called background adsorption. They are also superior to the known products in other respects.

Example 1

(a) 2 kg. of dextran having an average molecular weight of 40,000 were dissolved in 3000 ml. of an aqueous 2-n solution of sodium hydroxide and 360 g. of epichlorohydrin added thereto with a strong agitation. After 45 min. a gel had been formed which was cured by heating at 40° C. for 48 hours. The product was ground, dispersed in water and neutralized with hydrochloric acid. It was then washed on a filter and dried at 70° C. in a drying oven. The weight of the product was 2100 g. and its water regain was 5.7 g./g. 42 percent of the grains passed the 100 mesh sieve and 5.5 percent the 400 mesh sieve.

(b) 100 g. of a gel obtained according to (a) were placed in a baker with agitation and 30 g. of sodium hydroxide dissolved in 100 ml. of water were then added. 125 g. of sodium salt of brom-methanesulfonic acid were then added to the carefully mixed mass, in the form of grains, with agitation. The mixture was agitated intermittently at 60° C. and after 48 hours the main portion of the water had distilled off. The product was dispersed twice with 5 l. of water and dried in a heating oven at 50° C. for 24 hours. 128 g. of a substitution product having a water regain of 20 g./g. were obtained. The ion exchange capacity of the substance was determined and found to be 2.33 mequiv./g.

Example 2

(a) 200 g. white commercial dextrin were dissolved in 134 ml. of 5 N sodium hydroxide. 30 minutes after the addition of 60 ml. of epichlorohydrin the solution gelled. After standing at room temperature over night the product was ground, suspended in water, neutralized with hydrochloric acid and washed on a filter with water. After drying at 70° C. 220 g. were obtained. The water regain was 1.0 g./g.

(b) 50 g. of the product from (a) were swelled in a solution of 18 g. of sodium hydroxide in 50 ml. of water. A solution of 50 g. of sodium chloroacetate in 50 ml. of water was added and thoroughly mixed with the gel particles. The reaction was allowed to proceed at room temperature over night, whereupon it was heated to 60° C. for 4 hours. The product was suspended in water, neutralized with hydrochloric acid and washed with water. After drying at 60° C. the yield of the product was 68 g. Its water regain was 1.6 g./g. and the cation exchange capacity 2.47 mequiv./g.

Example 3

(a) To 20 kg. of dextran with an average molecular weight of 40,000 were added 27.2 l. of water, 4.4 kg. of 50 percent sodium hydroxide and 50 g. of sodium borohydride. The solution was thoroughly mixed with 3.6 kg. of epichlorohydrin. The mixture gelled after 1.5 hours. The reaction was completed by heating to 60° C. for 18 hours. The product was ground, suspended in water, neutralized with hydrochloric acid and washed with water. After drying in an oven at 70° C. a product was obtained with a water regain of 5.8 g./g.

(b) To 50 g. of the 50–270 mesh fraction of the product from (a) were added a solution of 51 g. of sodium hydroxide and 0.5 g. of sodium borohydride in 51 ml. of water. The swollen gel particles were suspended in 280 ml. of benzene and 150 g. of sodium chloroacetate were added. After heating to 72° C. for 22 hours the product was filtered off. It was suspended in water, neutralized, washed and dried in vacuo at 60° C. The yield was 46 g. of a product with water regain 20 g./g. and a cation exchange capacity of 3.42 mequiv./g.

*Example 4*

(a) To 70 kg. of dextran with an average molecular weight of 40,000 were added 71 l. of water and 21 kg. of 50 percent sodium hydroxide. To the solution were added 21 kg. of epichlorohydrin. The mixture gelled after 140 minutes and the reaction was completed by heating to 60° C. for 18 hours. The product was ground, suspended in water and neutralized. After repeated sedimentation in water and decantation of the supernate the gel particles were dried in an oven at 60° C. The yield was 70.1 kg. and the water regain 2.3 g./g.

(b) To 80 g. of the 50–270 mesh sieve fraction of the product from (a) were added a solution of 80 g. sodium hydroxide and 2 g. sodiumborohydride in 80 ml. of water. 122 g. of β-chloropropionic acid were intimately mixed with the swollen gel. After heating to 70° C. for 40 hours with intermittent stirring the product was suspended in water and neutralized. It was washed with water on a filter and dried in vacuo at 80° C. over night. The yield was 99 g. of a product with water regain 4.5 g./g. and a cation exchange capacity of 2.72 mequiv./g.

*Example 5*

(a) 200 g. of sorbitol were dissolved in 50 g. of sodium hydroxide in 50 ml. of water. 75 g. of epichlorohydrin were added dropwise during one hour at 50° C. After 5 hours at 50° C. the reaction mixture was dissolved in methanol and neutralized with conc. hydrochloric acid. The precipitated sodium chloride was filtered off and the methanol evaporated on a water bath. The residue was dissolved in 100 ml. of 2 N sodium hydroxide and 188 g. of ethyleneglycol-bis-epoxypropyl ether was added. The solution gelled after 15 minutes at 70° C. The reaction was completed by heating over night at 60° C. The product was ground, suspended in water, and neutralized. It was then washed on a filter and dried in vacuo at 60° C. The resulting gel weighed 307 g. and had a water regain of 2.5 g./g.

(b) To 50 g. of the gel obtained under (a) were added a solution of 50 g. of sodium hydroxide and 1 g. of sodium borohydride in 50 ml. of water. The swollen gel particles were suspended in 300 ml. benzene and 150 g. of sodium chloroacetate were added. After heating to 70° C. for 4 hours, the gel was filtered and washed with ethanol. It was then suspended in water, neutralized and washed with water. After drying in an oven at 60° C. the yield was 58 g. of a product with water regain 4.7 g./g. and a cation exchange capacity of 2.48 mequiv./g.

*Example 6*

(a) 22 g. of soluble starch were dissolved in 50 ml. of 0.5 N sodium hydroxide. 20 minutes after the addition of 15 g. of bis-epoxypropylether the solution gelled. The reaction was completed by heating to 50° C. for 18 hours. The product was ground, suspended in water, neutralized and washed. After drying in vacuum oven at 60° C. 33 g. of a product with water regain 2.2 g./g. were obtained.

(b) To 10 g. of the product obtained in (a) were added a solution of 15 g. of sodium hydroxide in 15 ml. of water. 16 g. of β-chloropropionic acid were added and the mixture was heated to 70° C. for 23 hours while stirred. The product was suspended in water, neutralized, and washed. After drying in a vacuum oven at 60° C. 10 g. of a product with water regain 3.3 g./g. and a cation exchange capacity of 2.03 mequiv./g. were obtained.

*Example 7*

(a) 290 g. of dextran having an average molecular weight of 20,000 and 58 g. of sodium hydroxide were dissolved in 360 ml. of water. Then 110 g. of epichlorohydrin were stirred into the dextran solution. The reaction was allowed to proceed at 50° C. for 16 hours. Then the gel obtained was ground, suspended in water, neutralized with hydrochloric acid, washed with water and dried. The water regain of this product was 2.5 g./g. The yield was 275 g.

(b) 100 g. of the product obtained under (a) was suspended in 500 ml. of toluene. A soltuion of 50 g. of sodium hydroxide in 250 ml. of water was added while stirring followed by 210 g. of sodium bromoethane sulfonate. After reaction at 80° C. for 16 hours, the product was suspended in water, the toluene was decanted away, the product was neutralized with hydrochloric acid, washed with water and dried. Its ion-exchange capacity was 2.0 mequiv./g. and its water regain was 4.0 g./g. The yield was 135 g.

*Example 8*

(a) 240 g. of dextran having an average molecular weight of 200,000 and 25 g. of sodium hydroxide were dissolved in 600 ml. of water. Then 25 g. of epichlorohydrin were stirred into the solution. After reaction and working-up according to Example 7(a), a product having a water regain of 5.0 g./g. was obtained. The yield was 230 g.

(b) 100 g. of the product obtained according to (a) were suspended in 500 ml. of toluene. A solution of 50 g. of sodium hydroxide in 200 ml. of water was added with stirring followed by 140 g. of sodium chloroacetate. After 1 hour at 70° C., 25 g. of sodium hydroxide in 25 ml. of water and 70 g. of sodium chloroacetate were added. This operation was repeated once more after another hour. The reaction was allowed to proceed for another three hours at 70° C. The product was then recovered as set forth in Example 7(b). It had an ion-exchange capacity of 5.0 mequiv./g. and a water regain of 30 g./g. The yield was 120 g.

*Example 9*

(a) 20 g. of polyvinyl alcohol and 3 g. of sodium hydroxide were dissolved in 120 ml. of water. Then 5 ml. of epichlorohydrin were stirred into the solution. After reaction and working-up according to Example 7(a), 19 g. of a product having a water regain of 7.7 g./g. were obtained.

(b) 18 g. of the product as obtained according to (a) were suspended in 75 ml. of toluene. A solution of 9 g. of sodium hydroxide in 36 ml. of water and 26 g. of sodium chloroacetate was added. After one hour at 70° C., a solution of 4.5 g. of sodium hydroxide in 4.5 ml. water and 13 g. of sodium chloroacetate were added. This was repeated after another hour. After another three hours at 70° C., the product was recovered according to Example 7(b). The yield was 18 g. and the ion-exchange capacity of the product was 2.7 mequiv./g. Its water regain was 17.8 g./g.

*Example 10*

(a) 55 g. of hydroxyethyl cellulose and 11 g. of sodium hydroxide were dissolved in 165 ml. of water. Then 18 ml. of epichlorohydrin were stirred into the solution. After reaction and working-up according to Example 7(a), there were obtained 27 g. of a product having a water regain of 3.3 g./g.

(b) 18 g. of the product obtained according to (a) was subjected to the same treatment as set forth in Example 9(b). 23 g. of a product with an ion-exchange capacity of 3.9 mequiv./g. was obtained.

*Example 11*

(a) 290 g. of sucrose and 65 g. of sodium hydroxide were dissolved in 300 ml. of water and 140 g. of epichlorohydrin were stirred into the solution. The reaction was allowed to proceed at 40° C. It was caused to cease slightly before a gel was formed. The viscous solution was diluted with water, neutralized with hydrochloric acid and the copolymer of sucrose with epichlorohydrin was precipitated by the addition of ethanol. It was purified by four such precipitations. The yield was 70 g.

In order to get a gel of this copolymer 48 g. thereof and 5 g. of sodium hydroxide were dissolved in 110 ml. of water and 10 ml. of epichlorohydrin were stirred into the solution. After reaction at 50° C. for 16 hours, the gel obtained was worked-up according to Example 7(a). The yield was 45 g. and the water regain of the product was 2.9 g./g.

(b) 18 g. of the product as obtained according to (a) was treated as set forth in Example 9(b), whereby were obtained 25 g. of a product with an ion-exchange capacity of 4.0 mequiv./g. and a water regain of 6.0.

The present invention is of great value, because it enables the provision of ion-exchangers having satisfactory ion-exchange properties combined with high water regains. Such ion-exchangers present excellent properties when using them for the chromatography of large molecules.

What we claim is:
1. As a novel compound, a copolymerizate of:
   (a) a member selected from the group consisting of dextran, sucrose, starch, sorbitol, dextrin; polyvinyl alcohol and hydroxyethyl cellulose,
   (b) a bi-functional organic substance selected from the group consisting of epichlorohydrin, bis-epoxypropyl-ether and ethylene glycol-bis-epoxy propyl ether which is capable of linking together the aforesaid members by the formation of ether linkages;
   (c) said copolymerizate originally containing from 10 to 35 percent of hydroxyl groups, based on the weight of the dry substance, and having from 6 to 50 percent of their hydroxyl groups originally present in the formation substituted by a member selected from the group consisting of radicals of the type $R_1Y$, wherein
   (d) $R_1$ is an alkylene containing from one to two, inclusive, carbon atoms, and
   (e) Y is selected from the group consisting of carboxyl and sulfo; and said novel compound,
   (f) being insoluble in water but capable of swelling therein;
   (g) having a water regain within the range of 1–50 grams per gram of the dry compound, and
   (h) having an ion-exchange capacity within the range of from 2 to 6 milliequivalents per gram of the dry compound.

2. A cation-exchanger consisting of the novel compound set forth in claim 1.

References Cited by the Examiner

UNITED STATES PATENTS

| | | | |
|---|---|---|---|
| 3,042,667 | 7/1962 | Flodin | 260—209 |
| 3,208,994 | 9/1965 | Flodin | 260—209 |
| 3,226,380 | 12/1965 | Knight | 260—2.2 |

SAMUEL H. BLECH, *Primary Examiner.*

J. C. MARTIN, *Assistant Examiner.*